Sept. 4, 1956  N. E. HARRINGTON  2,761,340
WHEEL LUG-BOLT WRENCH
Filed Sept. 9, 1955

INVENTOR
Norman E. Harrington
BY Webster & Webster
ATTYS.

United States Patent Office 2,761,340
Patented Sept. 4, 1956

2,761,340

WHEEL LUG-BOLT WRENCH

Norman E. Harrington, Modesto, Calif.

Application September 9, 1955, Serial No. 533,443

8 Claims. (Cl. 81—54)

This invention relates to an improved wheel lug-bolt wrench, and especially to such a wrench adapted for use to loosen and remove the lug bolts which secure truck wheels in place.

In loosening the lug bolts of truck wheels, which lug bolts frequently are extremely tight, an operator—such as a truck driver who must change a wheel on the road—ofttimes experiences considerable difficulty. This is for the reason that a relatively great turning force must be applied to each lug bolt to loosen the same, and with a conventional wrench—whose shank is unsupported axially outwardly from the socket—there is a tendency for such shank to swing out of alinement with the lug bolt or to cant laterally when such force is applied. This either prevents ready unloosening of the lug bolt, or the socket of the wrench may slip off of such lug bolt.

It is therefore the major object of this invention to provide a wheel lug-bolt wrench which includes a novel stabilizing device adapted to positively and rigidly—but turnably—support the wrench shank from the wheel, with the socket properly engaged on a lug bolt, and said shank axially alined therewith; this to the end that when the operator imparts a relatively great turning force to the wrench—as by a leverage bar—such wrench is nevertheless maintained in correct position for lug-bolt unloosening and removal.

Another important object of this invention is to provide a wheel lug-bolt wrench, as in the preceding paragraph, in which said stabilizing device comprises a heavy-duty spanner and supporting bar adapted to extend generally diametrally within the wheel, being adjustable in length so as to positively bind against the wheel rim at opposed points; such spanner and supporting bar intersecting the wrench shank intermediate its ends and at a right angle, the shank being mounted on the bar in a manner whereby it is rotatable, yet maintained in unitary relation with said bar for the described use of the wrench.

It is also an object of this invention to provide a wheel lug-bolt wrench, embodying the novel stabilizing device, which is designed for ease and economy of manufacture.

Still another object of the invention is to provide a practical, reliable, and durable wheel lug-bolt wrench, and one which will be exceedingly effective for the purpose for which it is designed.

These objects are accomplished by means of such structure and relative arrangement of parts as will fully appear by a perusal of the following specification and claims.

Figure 1:
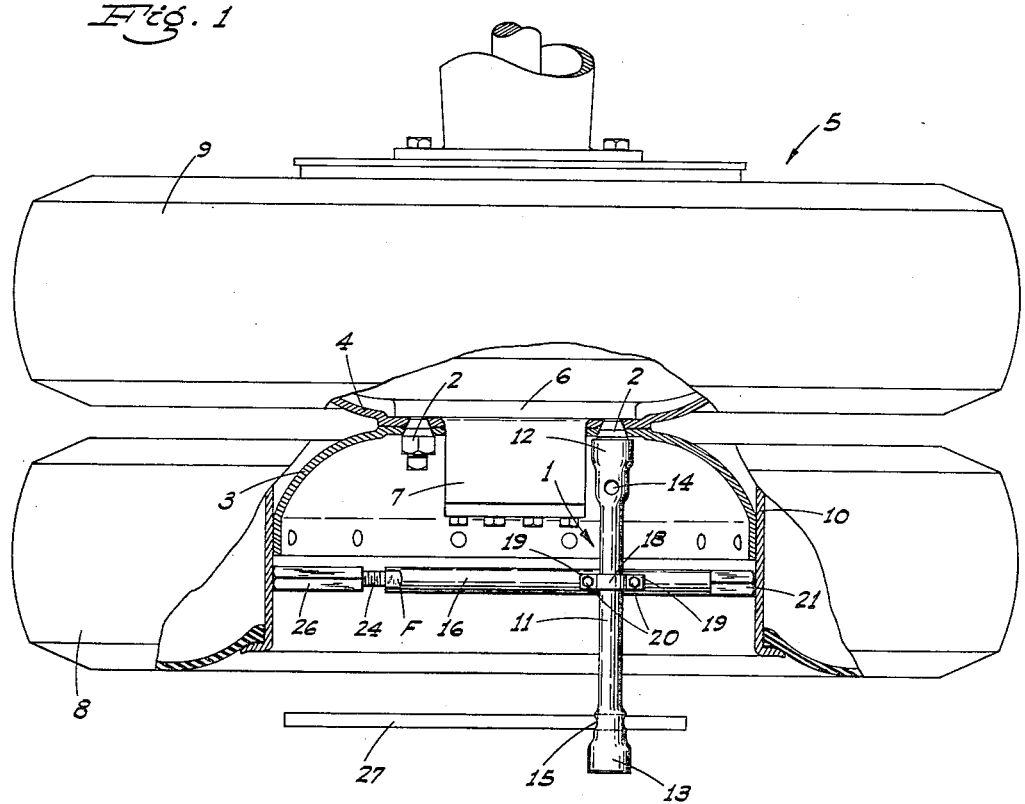
Fig. 1 is a plan view of a dual wheel assembly, partly broken away and showing the wheel lug-bolt wrench, including the novel stabilizing device, as in use to loosen and remove a lug bolt.
Figure 2:
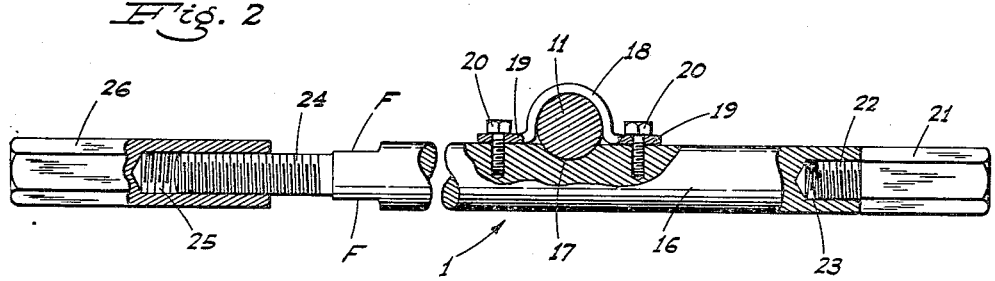
Fig. 2 is an enlarged vertical elevation of the spanner and supporting bar, with the wrench shank mounted in connection therewith; the view being partly in section, and said shank likewise being in section.

Referring now more particularly to the drawings, and to the characters of reference marked therein, the improved wheel lug-bolt wrench is indicated generally at 1 and is adapted for use to loosen and remove the headed lug bolts 2 which secure the outer and inner wheels 3 and 4 of a dual wheel assembly 5 of a truck to the flange 6 of a hub 7. The hub 7 usually projects axially outwardly into the outer wheel 3, and the headed lug bolts 2 surround such hub in concentric relation to the axis thereof. In no event, however, does the hub 7 project into the outer wheel 3 more than a limited distance, so that there is no obstruction by said hub to the use of the wheel lug-bolt wrench 1 in the manner which will hereinafter be described.

The wheels 3 and 4 include, of course, rims which carry tires 8 and 9; the rim of the outer wheel 3 being indicated at 10.

The wheel lug-bolt wrench 1 comprises a heavy-duty shank 11 formed on each end with a socket and with an adjacent but inwardly disposed cross bore; said sockets being indicated at 12 and 13, while said cross bores are indicated at 14 and 15.

The shank 11 of the wrench is intersected, intermediate its ends and at a right angle, by a heavy-duty spanner and supporting bar 16; the point of intersection being offset in one direction from the longitudinal center point of said bar.

At such point of intersection the spanner and supporting bar 16 is formed with a transversely extending, concave cradle or notch 17 in which the shank 11 bears, and said shank is maintained in said notch—but in turnable relation—by a saddle strap 18 engaged over such shank. At its ends the saddle strap 18 is formed with oppositely projecting ears 19 which are secured to the bar 16 by cap screws 20.

At one end the spanner and supporting bar 16 is fitted with an axial, multi-faced extension head or nut 21 which includes a reduced-diameter, axial neck 22 threaded into a tapped bore 23 in said bar; the extension head 21 normally being run up tight against the adjacent bar end.

At its opposite end the spanner and supporting bar 16 is formed with a reduced-diameter, axial neck 24 which is threaded into a tapped bore 25 in an adjustable multi-sided, elongated nut 26; the neck 24 normally being run only part way into said bore 25.

When the above described wheel lug-bolt wrench is in use one of the sockets (here shown as the socket 12) is first engaged on a lug bolt 2, with the shank 11 alined therewith; i. e., projecting axially outwardly.

The offsetting of the shank 11 on the spanner and supporting bar 16 is such that when the socket 12 is engaged on one of the lugs 2 the axial extension head 21 normally abuts the rim 10. Thereafter, with a jaw wrench the operator adjusts the elongated nut 26 axially outwardly and until it engages in forceful binding relation against the rim 10 at a point opposite that at which the head 21 abuts said rim. If desired, and in order to prevent any possible rotation of the bar 16 when the nut 26 is being so adjusted, another wrench may be applied to said bar, the latter having one or more flats F thereon for engagement by said other wrench.

After the spanner and supporting bar 16 is secured in a rigid position within the wheel 3, the operator inserts a pinch or leverage bar 27 through the outermost cross bore—here the cross bore 15. By thrusting such leverage bar 27 in a proper direction the engaged lug bolt 2 can be readily unloosened and removed; this for the reason that the bar 16 effectively supports the shank 11 in correct position, without possibility of its swinging out of alinement with the engaged lug bolt 2, or the socket escaping from the latter. Consequently, the operator can impose a much greater turning force on the engaged lug bolt than would otherwise be the case, with the result that such lug bolt can be loosened and removed without the difficulties heretofore encountered.

After each lug bolt 2 is so loosened and removed the elongated nut 26 is adjusted to loosen the same, whereupon the wrench is repositioned for cooperation with another of said lug bolts 2, and the operation is repeated.

The axial extension head or nut 21, while normally tight against the adjacent end of the bar 16, may also be adjusted outwardly to compensate for any slight difference in normal rim size, and further it may be desirable to provide extension heads 21 having different effective lengths, dependent on the radius of the circle in which the lug bolts 2 are disposed.

The described wheel lug wrench 1 provides a very effective and positive tool for the intended use, yet being relatively simple and convenient to manipulate.

From the foregoing description it will be readily seen that there has been produced such a device as will substantially fulfill the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as being new and useful, and upon which Letters Patent are desired:

1. A wheel lug-bolt wrench, for use with a wheel having a rim projecting outwardly of the securing lug bolts, comprising a rotatable shank, an axially opening socket on one end of the shank adapted for individual engagement on said lug bolts, a spanner and supporting bar intersecting the shank intermediate its ends, and means securing the shank in turnable relation on the spanner and supporting bar, the latter being adjustable in its effective length, and disposed within the rim when the socket is engaged on a lug bolt, the lengthwise adjustment being effective for rigidly but releasably binding the supporting bar at its ends against said rim.

2. A wheel lug-bolt wrench, for use with a wheel having a rim projecting outwardly of the securing lug bolts, comprising a rotatable shank, an axially opening socket on one end of the shank adapted for individual engagement on said lug bolts, a spanner and supporting bar intersecting the shank intermediate its ends, means securing the shank in turnable relation on the spanner and supporting bar, the latter being disposed within the rim when the socket is engaged on a lug bolt, and a longitudinally adjustable nut included on and projecting from one end of the bar whereby, when said nut is adjusted axially outwardly, the bar is rigidly but releasably bound against the rim.

3. A wheel lug-bolt wrench, for use with a wheel having a rim projecting outwardly of the securing lug bolts, comprising a rotatable shank, an axially opening socket on one end of the shank adapted for individual engagement on said lug bolts, a spanner and supporting bar intersecting the shank intermediate its ends, the shank being offset from the longitudinal center point of the spanner supporting bar, means securing the shank in turnable relation on said spanner supporting bar, the latter being disposed within the rim when the socket is engaged on a lug bolt, and means included with the spanner and supporting bar arranged to rigidly but releasably bind the same against the rim.

4. A wheel lug-bolt wrench, for use with a wheel having a rim projecting outwardly of the securing lug bolts, comprising a rotatable shank, an axially opening socket on one end of the shank adapted for individual engagement on said lug bolts, a spanner and supporting bar intersecting the shank intermediate its ends, means securing the shank in turnable relation on the spanner and supporting bar, said means including a saddle engaged over the shank and secured to the spanner and supporting bar, the latter having a concave notch in which the saddle engaged portion of the shank seats, said spanner and supporting bar being disposed within the rim when the socket is engaged on a lug bolt, and means included with the spanner and supporting bar arranged to rigidly but releasably bind the same against the rim.

5. A wheel lug-bolt wrench, for use with a wheel having a rim projecting outwardly of the securing bolts, comprising a rotatable shank, an axially opening socket on one end of the shank adapted for individual engagement on said lug bolts, a spanner and supporting bar intersecting the shank intermediate its ends, means securing the shank in turnable relation on the spanner and supporting bar, the latter being disposed within the rim when the socket is engaged on a lug bolt, and extension members threadingly secured to and projecting axially from the ends of the spanner and supporting bar; at least one of said members being adjustable to increase the effective length of said bar so as to rigidly but releasably bind the same against the rim.

6. A wheel lug-bolt wrench, for use with a wheel having a rim projecting outwardly of the securing lug bolts, comprising a rotatable shank, an axially opening socket on one end of the shank adapted for individual engagement on said lug bolts, the shank being of a length to then project outwardly of the rim, there being a cross bore in said projecting portion of the shank adapted to receive a leverage bar therein, a spanner and supporting bar intersecting the shank intermediate its ends, said spanner and supporting bar being disposed within the confines of the rim when the socket is so engaged on a lug bolt, means securing the shank in turnable relation on the spanner and supporting bar, and means included with the spanner and supporting bar to increase or decrease its effective length for binding the same at the ends rigidly against the rim at opposed points therein, or for release therefrom, respectively.

7. A wheel lug-bolt wrench, as in claim 6, in which said last named means includes an elongated nut having threaded connection with and extending endwise from one end of the spanner and supporting bar.

8. A wheel lug-bolt wrench, as in claim 7, in which said nut and a portion of the spanner and supporting bar have flat sides adapted for engagement with jaw wrenches.

References Cited in the file of this patent

UNITED STATES PATENTS

| Number | Name | Date |
|---|---|---|
| 1,154,154 | Wright | Sept. 21, 1915 |
| 1,525,213 | Lietze | Feb. 3, 1925 |
| 2,243,948 | Eyrick | June 3, 1941 |
| 2,454,027 | Baeza | Nov. 16, 1948 |
| 2,459,672 | Morsch | Jan. 18, 1949 |
| 2,550,542 | Factly | Apr. 24, 1951 |
| 2,614,444 | Moore | Oct. 21, 1952 |
| 2,632,350 | Kaster | Mar. 24, 1953 |